(12) United States Patent
Yovichin et al.

(10) Patent No.: US 6,716,012 B2
(45) Date of Patent: Apr. 6, 2004

(54) MOLD FOR A RUBBER TRACK

(75) Inventors: Albert James Yovichin, Copley, OH (US); Richard Alan Thomas, Hartville, OH (US); Ronald Paul Homolak, Brunswick, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/367,244

(22) Filed: Feb. 13, 2003

(65) Prior Publication Data

US 2003/0127911 A1 Jul. 10, 2003

Related U.S. Application Data

(62) Division of application No. 09/908,780, filed on Jul. 19, 2001, now Pat. No. 6,554,377.

(51) Int. Cl.[7] .......................... B29C 33/48; B29C 35/02
(52) U.S. Cl. ...................... 425/28.1; 425/34.2; 425/35; 425/54; 425/55; 425/394; 249/184
(58) Field of Search ................. 425/28.1, 34.2, 425/35, 54, 55, 394, 501; 249/184

(56) References Cited

U.S. PATENT DOCUMENTS

| | | | | |
|---|---|---|---|---|
| 2,890,490 A | * | 6/1959 | Morin | 249/184 |
| 3,161,443 A | | 12/1964 | Svensson | 305/13 |
| 3,472,563 A | | 10/1969 | Irgens | 305/13 |
| 3,791,897 A | | 2/1974 | Mesly | 156/137 |
| 3,918,861 A | | 11/1975 | Klose | 425/47 |
| 3,930,689 A | | 1/1976 | Maki | 305/35 |
| 3,948,110 A | | 4/1976 | Lassanske | 74/229 |
| 4,003,686 A | | 1/1977 | McLeod et al. | 425/373 |
| 4,207,052 A | * | 6/1980 | Satzler | 425/394 |
| 4,510,113 A | * | 4/1985 | Takano et al. | 425/28.1 |
| 4,589,941 A | | 5/1986 | Tanaka et al. | 156/140 |
| 4,687,261 A | | 8/1987 | Atkin | 305/57 |
| 5,373,909 A | | 12/1994 | Dow et al. | 180/9.1 |
| 5,536,464 A | | 7/1996 | Muramatsu | 264/254 |
| 5,709,440 A | | 1/1998 | Lecours | 305/178 |
| 5,888,330 A | | 3/1999 | Onaka et al. | 156/138 |
| 5,894,900 A | | 4/1999 | Yamamoto et al. | 180/9.36 |
| 6,051,178 A | | 4/2000 | Fike | 264/326 |
| 6,086,811 A | | 7/2000 | Fike | 264/271.1 |
| 6,177,042 B1 | | 1/2001 | Fike | 264/326 |

FOREIGN PATENT DOCUMENTS

| | | | |
|---|---|---|---|
| EP | 1106320 | 6/2001 | ........... B29C/33/02 |
| FR | 2537083 | 6/1984 | ........... B62D/55/24 |
| GB | 2104015 | 3/1983 | ........... B62D/55/24 |

* cited by examiner

*Primary Examiner*—James P. Mackey
(74) *Attorney, Agent, or Firm*—David L. King (57) ABSTRACT

A rubber track T has a plurality of guide lugs 50 arranged in two rows, one row being on each lateral edge. The guide lugs 50 of the first row are circumferentially offset from the guide lugs 50 of the second row. The track T is molded on an axially separating mold core D that is designed to form the radially inner guide lugs 50 without requiring a radially collapsible core.

7 Claims, 12 Drawing Sheets

MOLD FOR A RUBBER TRACK

This is a Divisional of application Ser. No. 09/908,780, filed Jul. 19, 2001, now U.S. Pat. No. 6,554,377.

FIELD OF THE INVENTION

The present invention relates generally to the molding of the vehicle supporting elements formed of rubber and more particularly to an improved mold and method for producing rubber tracks as well as the resultant track produced by the mold.

BACKGROUND OF THE INVENTION

Molded rubber tracks are in many cases being substituted for conventional metal tractor tracks. Rubber tractor tracks offer better maneuverability, better ride quality in rough fields, better flotation in wet fields, improved side hill stability, excellent traction, low maintenance and versatility compared to steel tractor tracks. Additionally, rubber tracks are being used with or even replacing conventional rubber tires on skid steer vehicles, tractors and other agricultural vehicles such as combines, trenchers, snow removers, spreaders, sprayers, wagons and carts, since rubber tracks are more friendly to agricultural fields, offer better flotation and less compaction than rubber tires, resulting in better crop yield. The use of rubber tractor tracks permits farmers to get out into the fields earlier in the planting season and plant more crops as compared to rubber tire equipped agricultural vehicles.

Rubber tractor tracks are defined by an endless rubber belt reinforced with continuous flexible steel cables bonded into the rubber. Presently, a complete rubber tractor track is molded flat in quarter sections, which are sequentially then bonded together during the curing process. In practice, the joint between the bonded-together sections tend to break in use. Additionally, the joint between the bonded-together ends is of a different cross-sectional dimension than the cross-sectional dimension of the major portion of the track length. Accordingly, during movement of the track-supported vehicle, the vehicle is subject to severe vibrations. Such vibrations are not only harmful to the vehicle, but also to pavement over which the vehicle is moved. Additionally, such vibration is annoying to the vehicle operator.

Another method involves building a complete track using a drum. Uncured or cured lugs are first manually clamped within pockets formed in the drum. Next, uncured rubber, calendered cord and wire cable are wrapped around the outside of the drum. Preformed uncured treads are then attached onto the uncured rubber. The drum is then disposed within an autoclave to cure the rubber and the parts attached thereto. The drum is then collapsed to remove the completed track. Since only low pressure can be applied the cured rubber is of a low density with resulting low strength. Also, the track lugs and treads are not generally integrally bonded to the rubber and are displaced during use.

Figure 1:
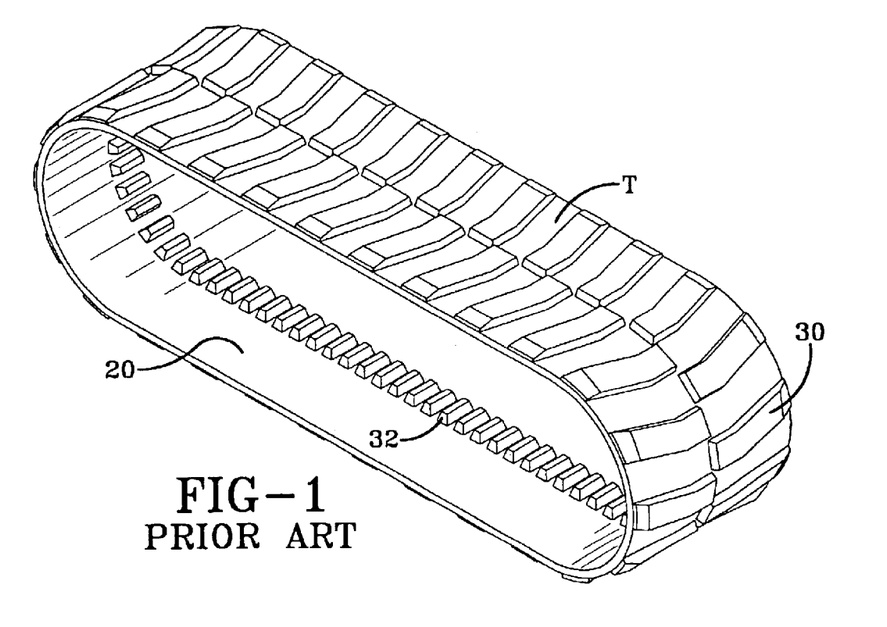
FIG. 1 is a perspective view of a completed prior art rubber track.

Another method described is U.S. Pat. No. 6,086,811 teaches using an axially separatable two piece curing drum having a plurality of cavities centrally located on the peripheral surface of the drum for forming drive or guide lugs on the inner surface of the inner track. The guide lugs are centrally located and the drum is formed by two parts abutted at the centerline of the drum shown in FIG. 1.

This curing and method used for forming the track also has an outer tread forming segmented mold portion. Once the track is molded the outer segments radially expand outwardly and the curing drum with cured band can be removed and the fastening means holding the drum halves together are removed enabling the drum halves to be pulled apart thereby freeing the freshly molded track.

The prior art methods described above work well on the large tracked vehicles having the track mounted on axially spaced pairs of wheels. These tracks have the guide lugs arranged in a single row and positioned between the wheels and thus are readily adapted to the molding system described above in U.S. Pat. No. 6,086,811.

Smaller tracks used on small four wheeled vehicles such as skid steer loaders must employ other types of guide lugs or track restraining means to keep the track from coming off each pair of wheels. One such track has closely spaced guide lugs one each side of the track in circumferential alignment. Such tracks are sold commercially under the Goodyear brand name Trackman®.

Due to the small size of these tracks the use of collapsible center segments is virtually impractical. The use of the split half curing drum as described in U.S. Pat. No. 6,086,811 is not possible due to the fact the guide lugs are positioned on the lateral ends or edges. Often this required a secondary attaching of guide lugs to be done with adhesives.

It is an object of the present invention to have a mold for tracked vehicles that does not require a radially collapsible core.

It is a further object to have two rows of guide lugs molded directly to the track band using a circular radial inner core.

SUMMARY OF THE INVENTION

An endless elastic track having guide lugs on the inner circumference and rubber tread lugs on the outer circumference and a thin continuous band extending in the circumferential directions is described. The thin band is circumferentially reinforced by substantially inextensible cords or bands. The track has a plurality of spaced rubber guide lugs. Each guide lug has an axial inner portion. The guide lugs are arranged in two rows. The first row of guide lugs is adjacent to the first lateral edge of the thin band and the second row of guide lugs is adjacent a second lateral edge of the thin band. The guide lugs for the first row are circumferentially offset relative to the guide lugs of the second row.

The guide lugs of the first row have no circumferential overlap relative to the guide lugs of the second row. The axial outer portion of the guide lugs are oriented substantially perpendicular to the circumferential direction. Each of the axial inner portions of the guide lugs can be inclined axially inwardly from a radially inner end toward the band.

The axially spaced distance S between the axially inner portions of the guide lugs of the first row and the second row at a location adjacent to the thin band is equal to or greater than the vehicle mount wheel width at the outer circumference of the wheels.

This elastic track having guide lugs on the inner circumference and rubber tread lugs on the outer circumference and a thin band continuously extending in the circumferential direction is produced by using an improved mold.

The improved mold has a radially outer molding portion for forming the tread lugs and a circular radially inner core for forming the guide lugs. The radial inner core has separable intermeshing first and second portions. Each first and second portion has a plurality of spaced spokes extending from a circular end. When the radially inner core has the first and second portions assembled and intermeshed, the spokes of the first portion are adjacent to the spokes of the second portion and the spokes of the first portion are spaced from the circular end of the second portion at the outer circumference of the radial inner core. The spokes of the second portion are also spaced from the circular end of the first portion at the outer circumference of the radial inner core. The spaces formed between the circular ends and the spokes formed guide lug cavities.

The spokes have an accurate circumferential outer surface having a radius of curvature R, R being the same as the radius of curvature of the circular ends. The spokes, in one embodiment preferably have a tapered end inclined axially outwardly and radially inwardly for forming the guide lugs with a thick base that narrows toward the tip. The spokes have axially extending sides in contact with the sides of the adjacent spokes of the opposite portion. The spokes are radially supported on one or both sides by an adjacent spoke of the opposite portion. The spokes of the first portion may have the ends radially supported by the circular end of the second portion while the spokes of the second portion may have the ends radially supported by the circular end of the first portion in one embodiment of the invention.

These and other features and advantages of the invention will become apparent from the following detailed description of the embodiments which taken in conjunction with the accompanied drawings illustrate by way of example the principles of the invention.

Definitions

"Circumferential" means lines or directions extending along the perimeter of the surface of the annular tread perpendicular to the axial direction.

"Cord" means one of the reinforcement strands of which the plies in the track are comprised.

"Equatorial plane (EP)" means the plane perpendicular to the track's axis of rotation and passing through the center of its tread.

"Footprint" means the contact patch or area of contact of the tread with a flat surface under load and pressure.

"Lateral" and "laterally" means lines or directions that are parallel to the axis of rotation of the tire (also "axial").

"Ply," means a continuous layer of rubber-coated parallel cords.

"Radial" and "radially" means directions extending radially toward or away from the axis of rotation of the track.

"Zero-degree wires" means at least one layer of parallel cords & usually metal wire), underlying the tread, unanchored to the bead, spiraling circumferentially around the tread, and having cord angles in the range from 0 degrees to 5 degrees with respect to the equatorial plane of the tire.

DETAILED DESCRIPTION OF THE INVENTION

Figure 2:
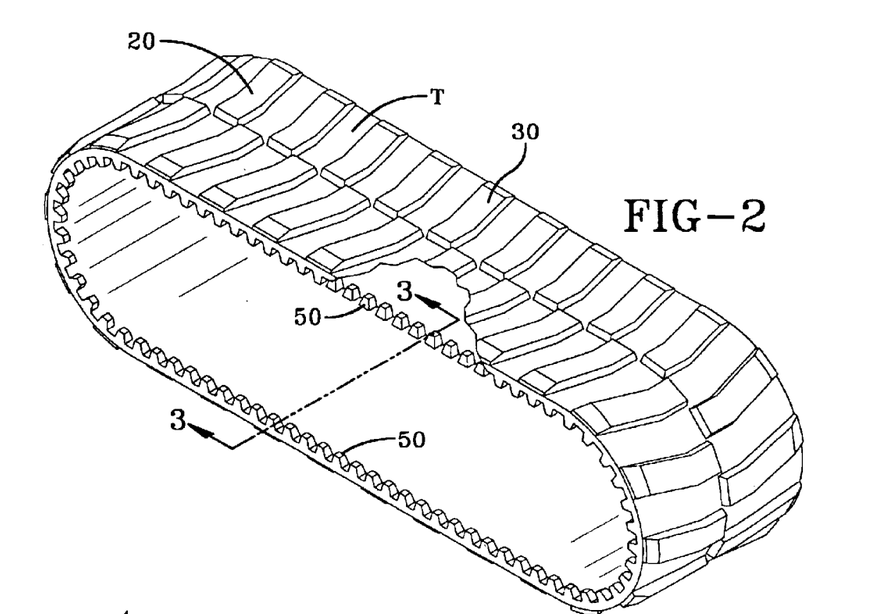
FIG. 2 is a perspective view showing a completed rubber track made in accordance with the present invention.
Figure 3:
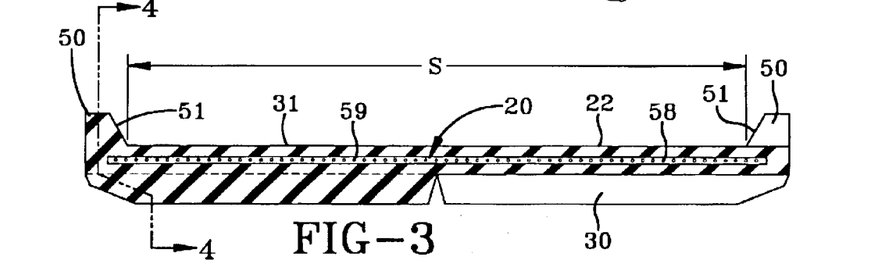
FIG. 3 is a cross-sectional view of the track taken along lines 3—3 of FIG. 2.
Figure 4:
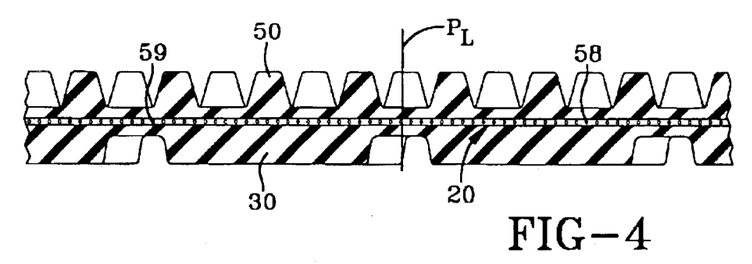
FIG. 4 is a cross-sectional view taken along lines 4—4 FIG. 3.

Referring to the drawings, in FIGS. 2, 3 and 4 there is shown rubber track T made in accordance with the apparatus and the method of the present invention. Such track T comprises an endless band 20 formed of rubber 22 and calendered cord and wire cable 59. It will be understood that such track T is adapted to be positioned upon the wheels or rollers (not shown) of a motorized vehicle such as a skidder loader, tractor, or the like to support such vehicle for movement along a desired surface such as construction site or an agricultural field. The exterior peripheral surface of band 20 is formed with integral treads 30. The lateral portions of the interior peripheral surface 31 of band 20 are formed with a plurality of guide lugs 50 on each side of the wheels or rollers of the vehicle, which is supported by track T.

An interesting aspect of the present invention is the fact that the guide lugs 50 on one side of the track are circumferentially offset relative to the guide lugs 50 on the opposite side of the track T. This feature allows the intermeshing spokes of 36a, 36b the building drum and curing core D to freely separate axially allowing the core D to be made without requiring a complex radially collapsible feature. The small tracks used on skid steer vehicles is of a sufficiently small size that collapsible cores are most difficult to manufacture. The present invention eliminates the need for such a feature.

Figure 18:
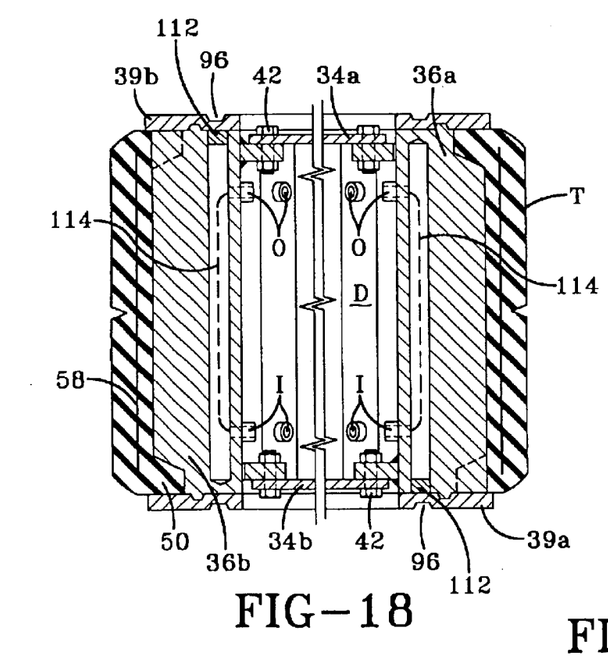
FIGS. 18 through 19 show the cured track being removed from the curing core.
Figure 19:
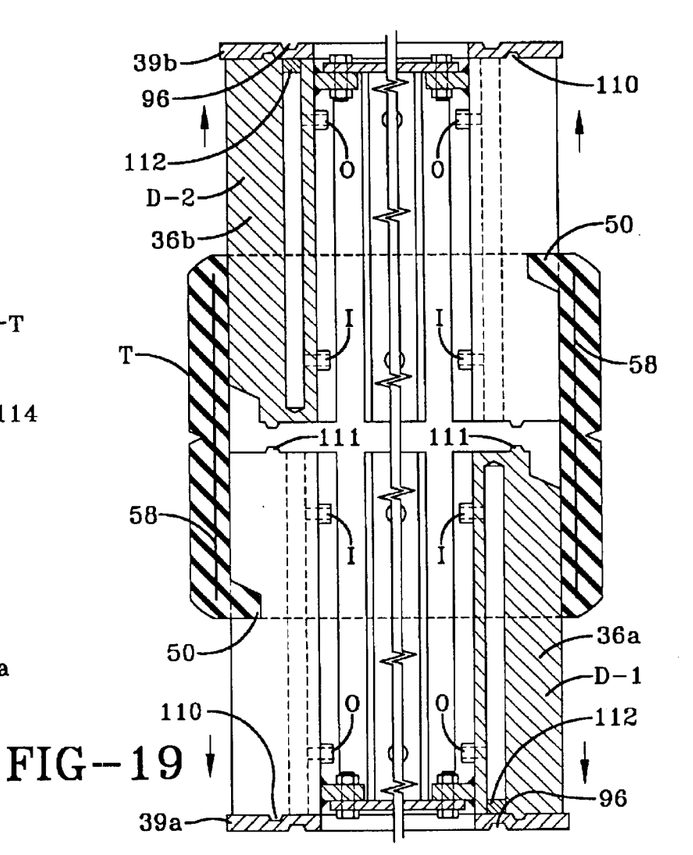

The spokes 36a, 36b of the building drum curing core D are slidably movable in such a way that the spokes 36a of one half 44a fit into the gaps between adjacent spokes 36b of the opposite half 44b. When viewed in cross-section the spokes 36a, 36b each have an accurate shape and when the two halves are slid together the spokes 36a, 36b on the opposite halves support and limit radially inward deflection of the spokes of the opposite half of the core D. This feature insures the core structure is rigidly resistant to radial deflections during the curing process. The term intermeshing spokes as used in description of the core D actually means the adjacent spokes 36a or 36b and the disk 39a, 39b of the opposite halves 44a, 44b support the spokes making the assembled core D a very stable and rigid structure. As illustrated in FIGS. 18 and 19 the spokes 36a, 36b of the respective halves D-1, D-2 have protrusions 411 that taper fit into the rings 110 in the respective annular rings 39a and 39b. This insures the spokes are supported at both ends.

Figure 13:
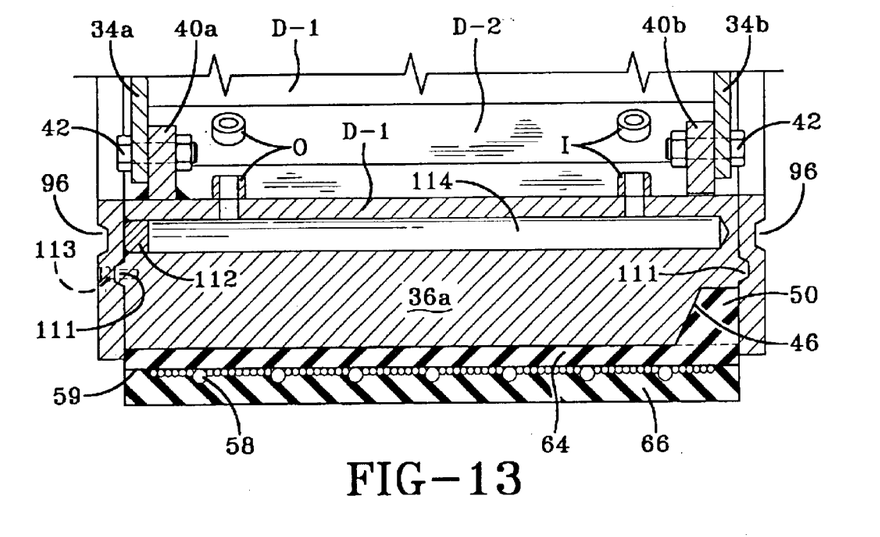

As illustrated in FIG. 13 each spoke has a space 114 connected to inlets! and outlets O for cooling and heating. The end of the space 114 showns a plug 112 welded to the spoke 36a or 36b. The end of each spoke 36a or 36b can be physically bolted or welded or otherwise fastened to the respective ring 39a or 39b, as show fasteners 113 are shown in FIG. 113 securing the spokes at one end opposite the guide lug forming end 45a or 45b. These features are very important to insure the dimensional accuracy needed to make a high quality track.

As shown the guide lugs 50 are spaced such that the lugs 50 on one half of the track T do not circumferentially overlap the guide lugs 50 of the opposite half. The guide lugs 50 are spaced sufficiently close to insure the track T stays on the wheels when mounted to the vehicle.

As illustrated, the guide-lugs 50 can have the wheel-contacting surface 51 inclined axially outwardly as a function of radial inward distance. This feature adds structural strength to the guide lugs to prevent unwanted lateral flexing. The axially outer non-wheel contacting surface 52 of the guide lugs 50 is aligned with the lateral edges of the band and oriented perpendicular to the interior peripheral surface 31 of the track T.

As shown in FIG. 3 the distance S between the axially inner portions 51 of the guide lugs 50 of the first row and the second row at a location adjacent the inner peripheral surface 31 of the thin band is equal to or greater than the width of the vehicle mount wheels at the outer circumference of the wheels. The mount wheels are not illustrated.

Figure 5:
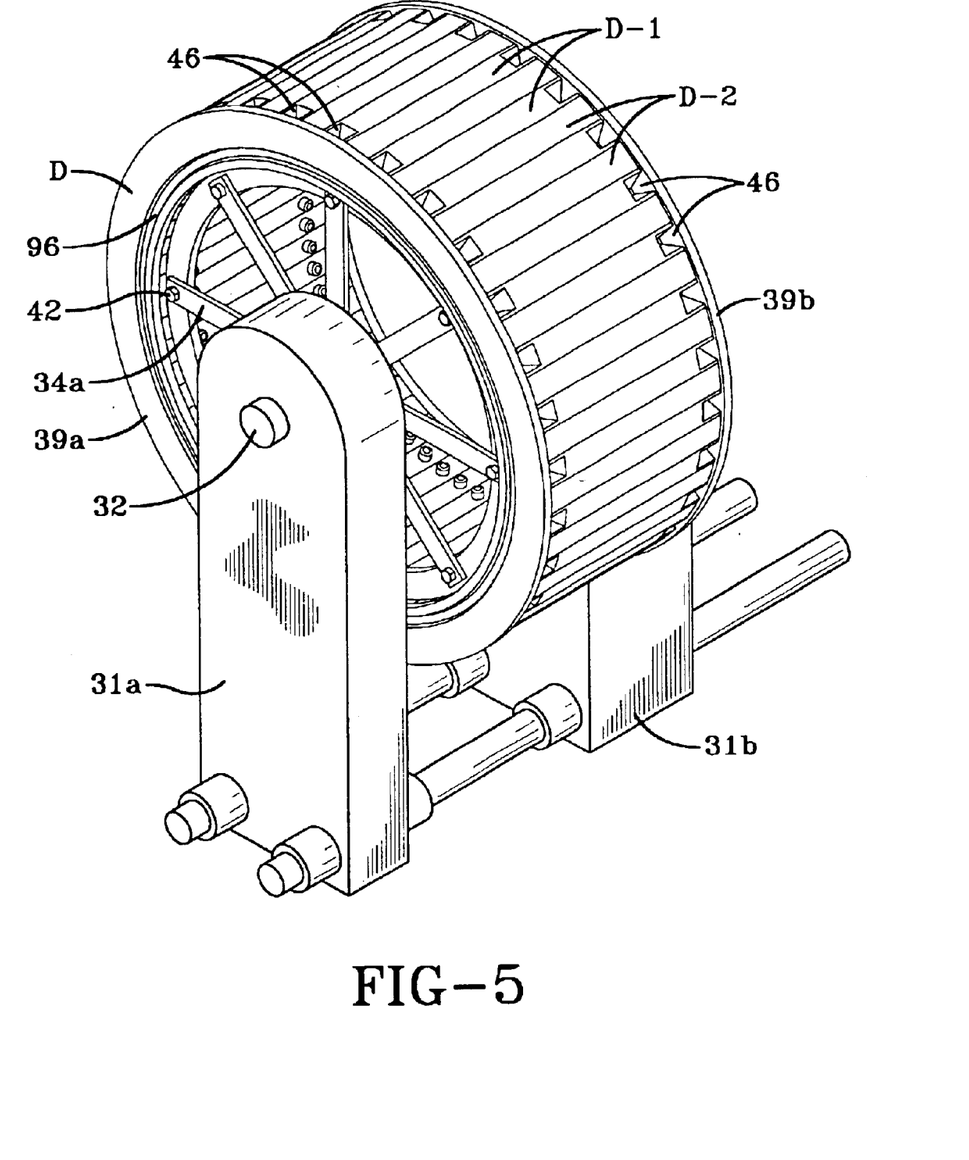
FIG. 5 is a perspective view showing a building and curing core or drum D for forming part of the rubber track of the present invention, the two halves D-1 and D-2 intermeshed and fully assembled.
Figure 6:
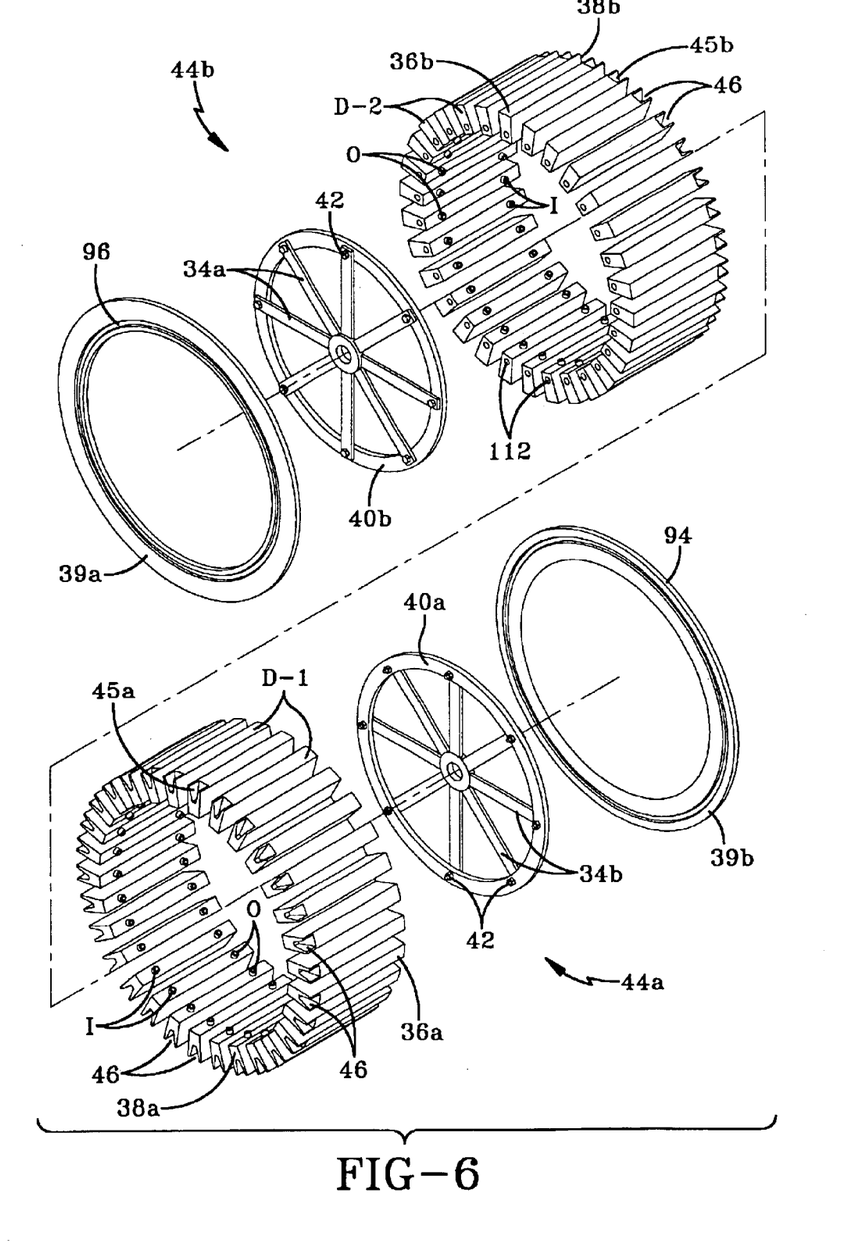
FIG. 6 is an exploded perspective view taken of each half D-1 and D-2.
Figure 7:
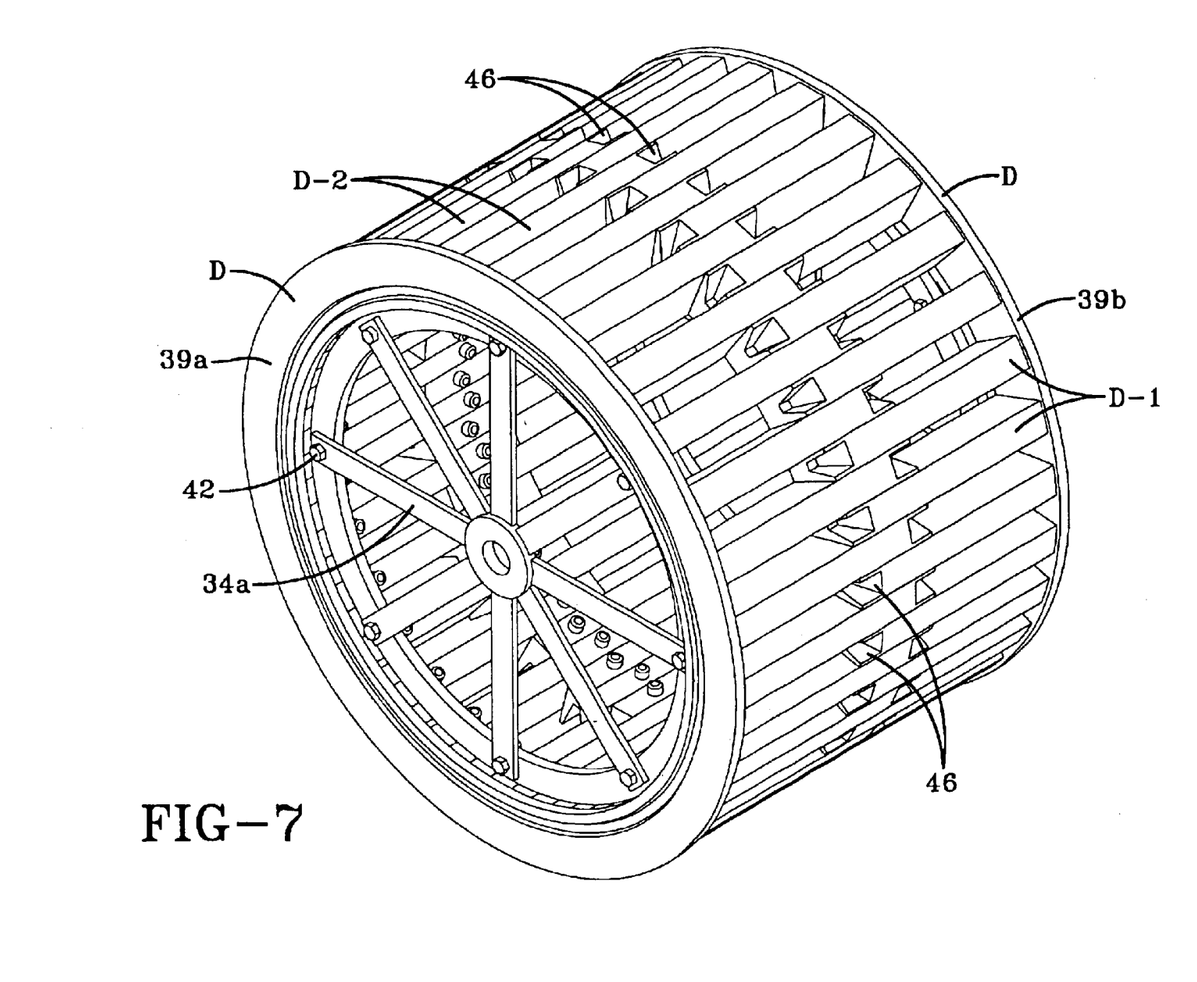
FIG. 7 is a view showing the interlocking core halves of FIG. 5 partially intermeshed and somewhat separated.

Track T of FIGS. 2, 3, and 4 is formed by the apparatus shown in FIGS. 5–19. Referring to FIGS. 5–7, such apparatus includes rotatable building drum and curing core or for simplicity simply a drum D which is utilized with mold M shown generally in FIGS. 8–19 to form a completed rubber tractor track T.

The building and curing drum D is preferably formed of a material, which is rapidly responsive to thermal changes, such as aluminum. Drum D is rotatably mounted upon a pair of pedestal 31 and 31b by means of a horizontal axle 32. Axle 32 is connected to the Drum D. The Drum D has a plurality of pairs of spokes 34a and 34b. As indicated particularly in FIG. 6, drum D consists of two mirror image halves or portions D-1 and D-2 (44a, 44b) so as to be horizontally separable. Each drum half D-1, D-2 includes an annular inner ring designated 40a, 40b respectively. These concentric rings 40a and 40b are fastened to the ends of respective spokes 34a or 34b by threaded fasteners 42, the ring 40 being bolted to the spokes 34a while the ring 40b is bolted to the spokes 34b. At the radially inner portion of the spokes 34a and 34b there is shown hubs 43a, 43b. These hubs are welded to the respective hubs and are designed to accept an axel 32 for the building procedure.

As shown in the figures, the rings 40a and 40b are designed to have the tubular spokes 36a and 36b positioned on to the radially outer surfaces of the rings 40a and 40b and welded thereto, the spokes 36a being welded to the ring 40a and the spokes 36b being welded to the ring 40b, respectively. A space between the spokes 36a and 36b is provided to permit the opposing spokes to be intermeshed when the drum halves D-1 and D-2 are assembled. When assembled the spokes 36a, 36b and the rings 40a, 40b are bolted to the end rings 39a and 39b respectively.

In FIG. 7 the two drum halves D-1 and D-2 are shown being assembled wherein spokes 36a and 36b are shown being slideably intermeshed as the two halves D-1 and D-2 are brought together. The drum halves 44a and 44b as marked in FIG. 6 when assembled has the radially outer surfaces of the spokes 36a and 36b form the circular outer surface of the Drum D.

As shown, each spoke has an end 35a, 35b each end has an opening 45a, 45b respectively. The openings 45a, 45b are cut into the spokes and when assembled to the opposite drum half D-1 or D-2 the abutting ends 38a or 38b and with the end ring 39a or 39b form guide lug cavities 46. This feature is discussed later permits the guide lugs 50 to be integrally molded to the rubber track T.

Referring again to FIGS. 8–13, the lug pockets 46 successively receive rubber guide lugs 50 with manually inserted or by means of a conventional power operated vertically reciprocating ram 52 positioned below the periphery of drum D. A supply of warm lugs can be provided by a downwardly inclined chute 54, which successively deposits lugs 50 at a position above the ram 52 in order that upward movement of the ram will force the guide lugs 50 into the guide lug pockets 46. The drum D sequentially receives one or more layers of uncured rubber R and conventional calendered cord 58 from one or more supply reels 56 rotatably supported on a frame F positioned adjacent drum D. The drum D also receives wire cable 59 from a second supply reel 60 carried by frame F adjacent supply reel 56. The frame also includes a stitcher pressure roller 62, which exerts radially inwardly directed force against uncured rubber and calendered cord during rotation of drum D. An operator 0 positioned at a console 64, controls operation of the drum, the supply reels, ram 52 and a guide lug feeder 66 for chute 54.

Figures 8, 9, 10:
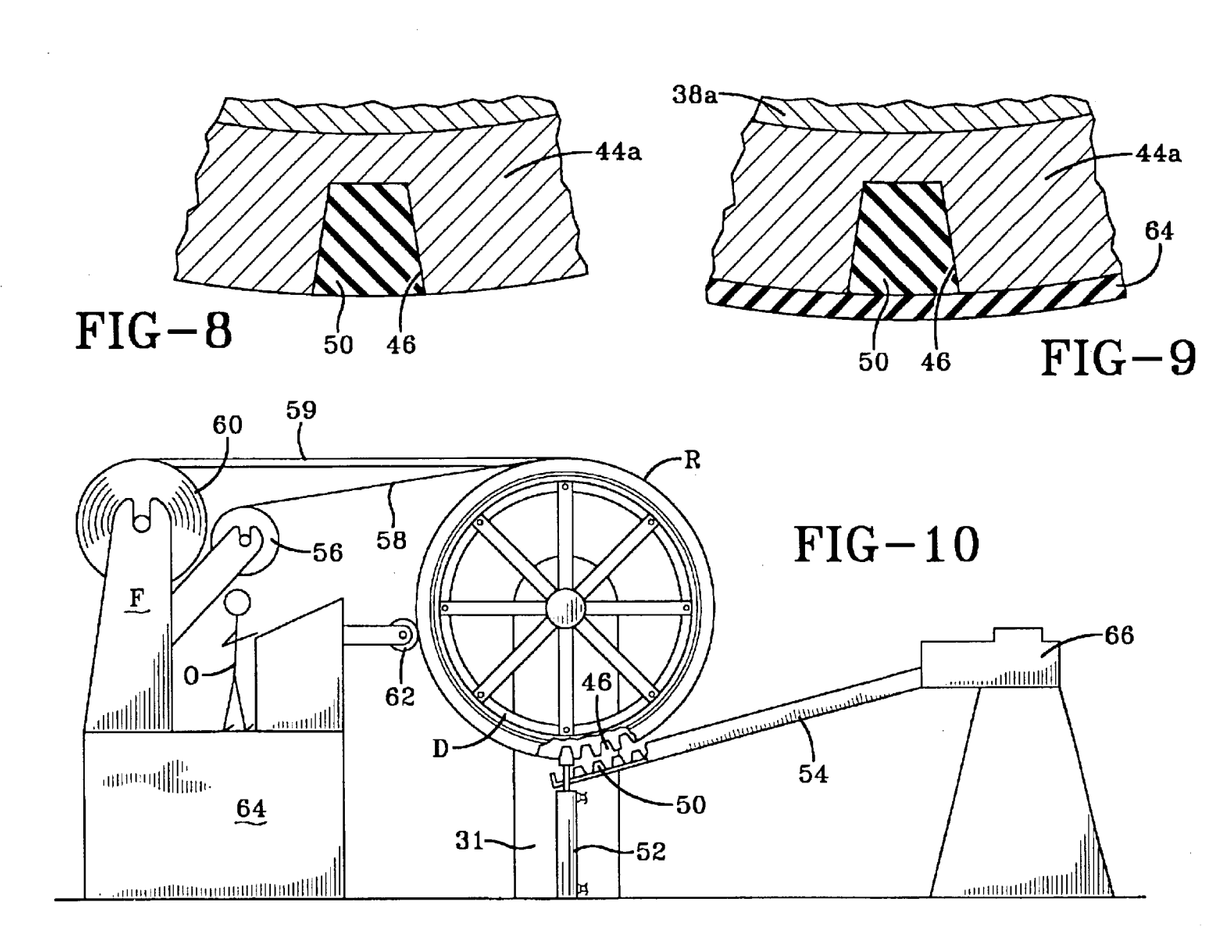
FIGS. 8 through 13 show successive steps utilized in rubber track molding system of the present invention to deposit rubber, calender cord and wire cable on the core of the mold.
Figure 11:
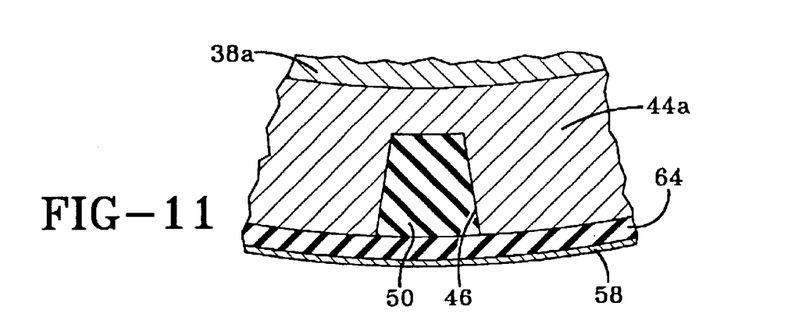
Figure 12:
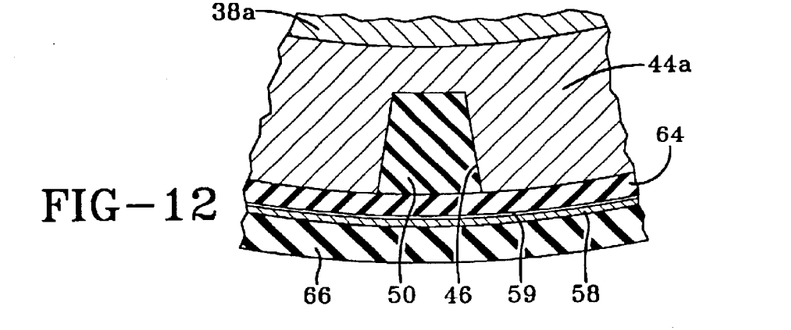

Referring additionally to FIGS. 8 and 10, in the operation of the drum D guide lugs 50 can be heated to a soft condition so as to conform to the pockets and remain secured within drive lug pockets 46 after insertion of the drive lugs into the pockets by ram 52. This step is indicated in FIG. 8. In FIG. 9, a first layer of uncured rubber 64 is shown being wrapped around the rim R of drum D. In FIG. 11, a layer of calendered cord 58 will be wrapped about such rim over the layer of uncured rubber. Next, wire cables 59 will be wrapped about rim R, and a second layer 66 of uncured rubber is shown in FIG. 12 after having been wrapped about the drum D over the calendered cord 58 and wire cable 59. It should be understood that the number of layers of uncured rubber, calendered cord and wire can be varied to suit the specifications of a particular track manufacturer. In FIG. 13, the appearance of the guide lugs, uncured rubber layers, calendered cord and wire cables are shown. At this point, the uncured rubber and calendered cord will be ready for curing within mold M.

Figure 16:
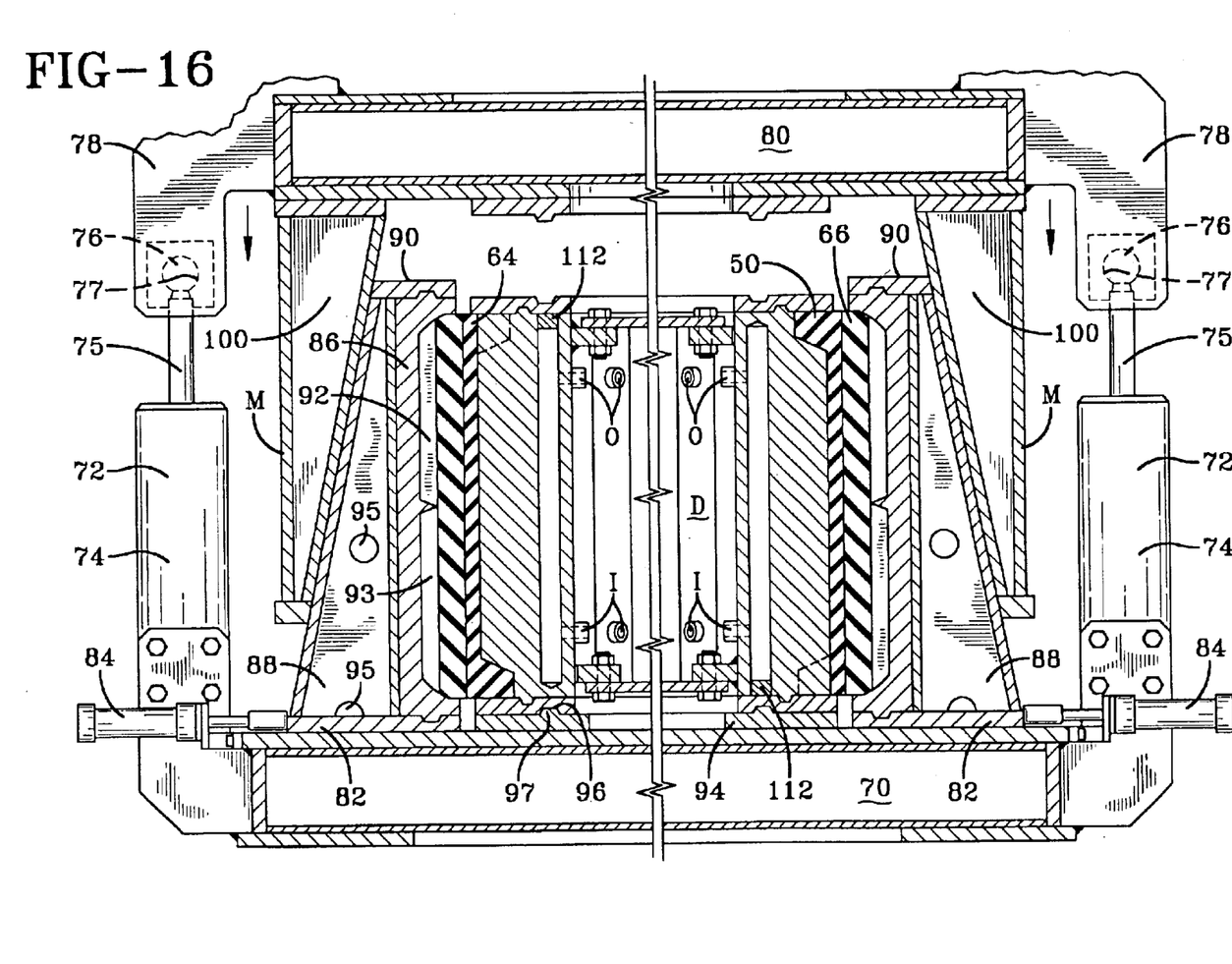

Referring now to FIGS. 14–17, mold M includes a base 70 provided at its outer periphery with a plurality of vertically extending hydraulic rams 72 of conventional construction. Each ram includes a cylinder 74 which effects vertical reciprocal movement of a plunger 76 formed at its upper end with a ball 76. Referring to FIG. 16, the balls 76 are received by complementary socket 77 formed in circumferentially spaced brackets 78 supported by the outer periphery of mold top 80. With continued reference to FIG. 14, mold base 70 horizontally, slidably supports a plurality of like outer mold segments S. Each mold segment includes a bottom ring 82 which is slidably supported upon the upper portion of mold base 70 for horizontal reciprocal movement relative to such mold base under the influence of a plurality of horizontally disposed conventional hydraulic or air-actuated cylinder and piston units 84. The mold segments include an outer matrix 86 encompassed by an upwardly tapered hollow heating cone 88. A segmented top ring 90 is disposed over the upper ends of the outer matrices 86 and the cones 88. The inwardly facing surfaces of the outer matrices 86 are formed with tread-forming complementary ribs 92 and grooves 93. A stop ring 94 is secured to the upper surface of mold base B to limit the radially inward movement of the mold segments S. Cones 88 are formed with steam passage apertures 95 connected to a source of steam (not shown) or other heating means in a conventional manner.

Drum inner halves 44a and 44b are provided with fluid inlets I and outlets O to selectively connect the tubular spokes 36a, 36b with steam or other heating medium and/or chilled water if needed. Steam is admitted into such space after the drum D is lowered into mold M and the mold is closed so as to heat the drum halves 44a and 44b. The drum D acts as an inner matrix during curing of the rubber, as explained below.

Figure 14:
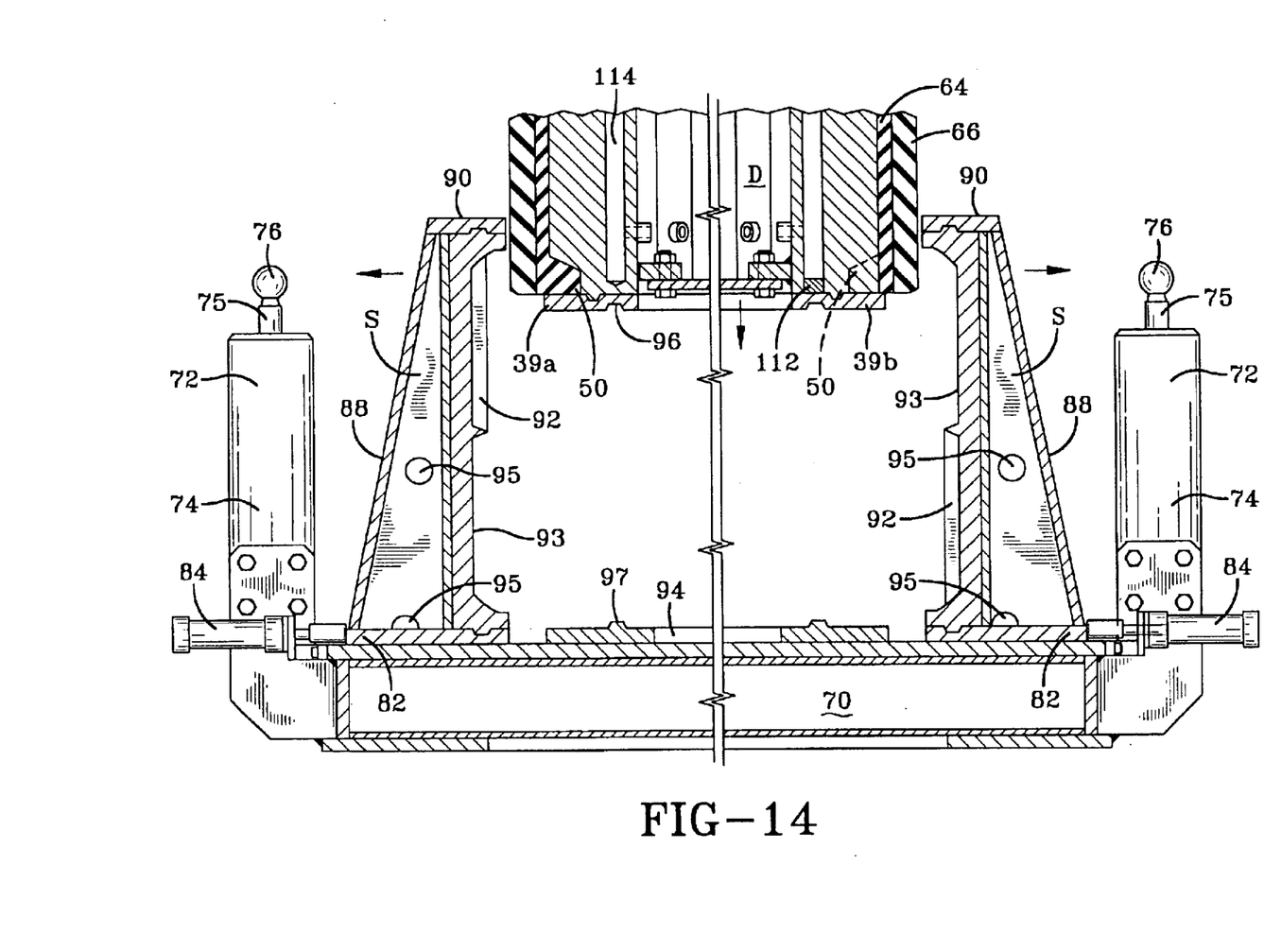
FIGS. 14 through 17 show the mold M with the track on the curing core.
Figure 15:
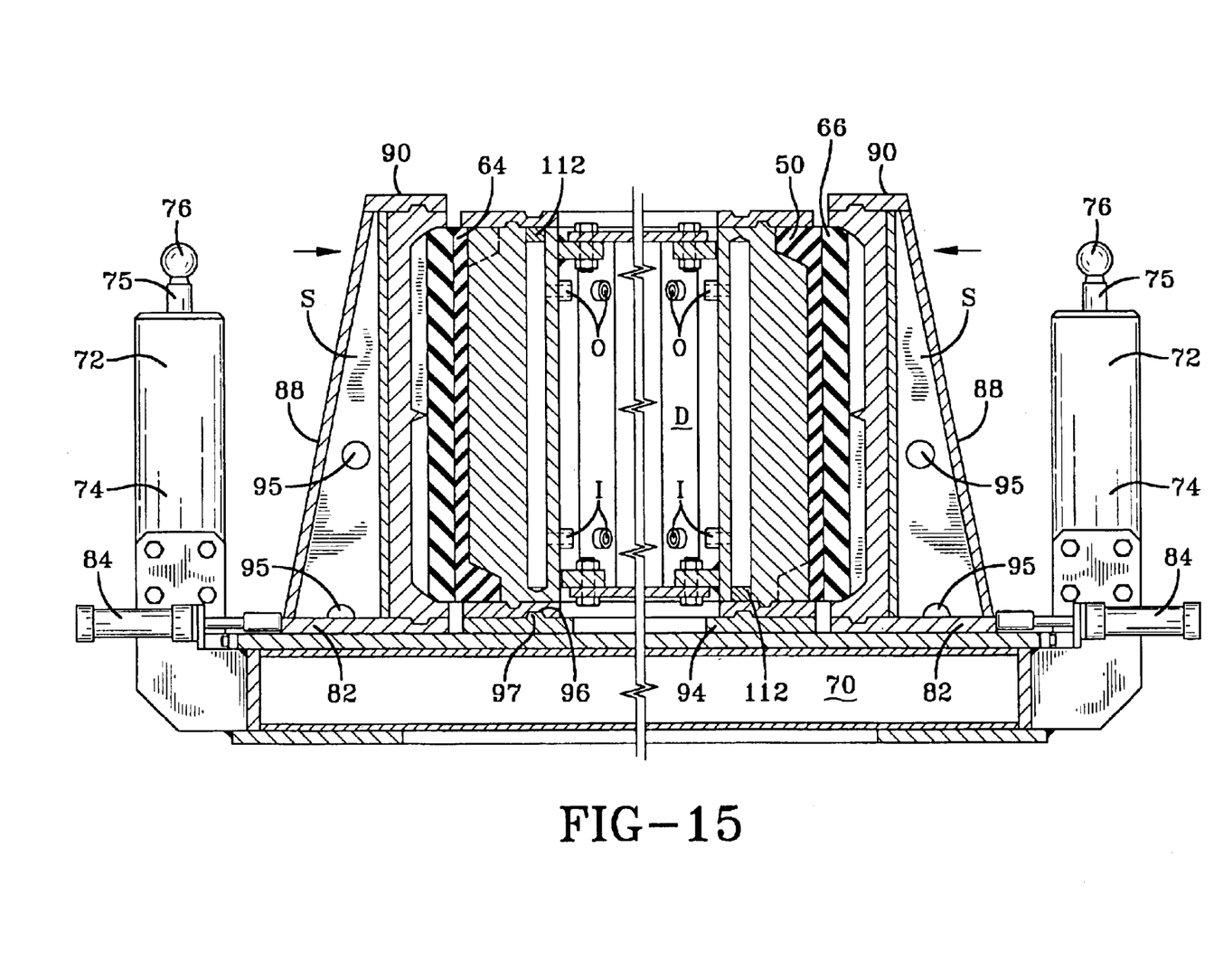
Figure 17:
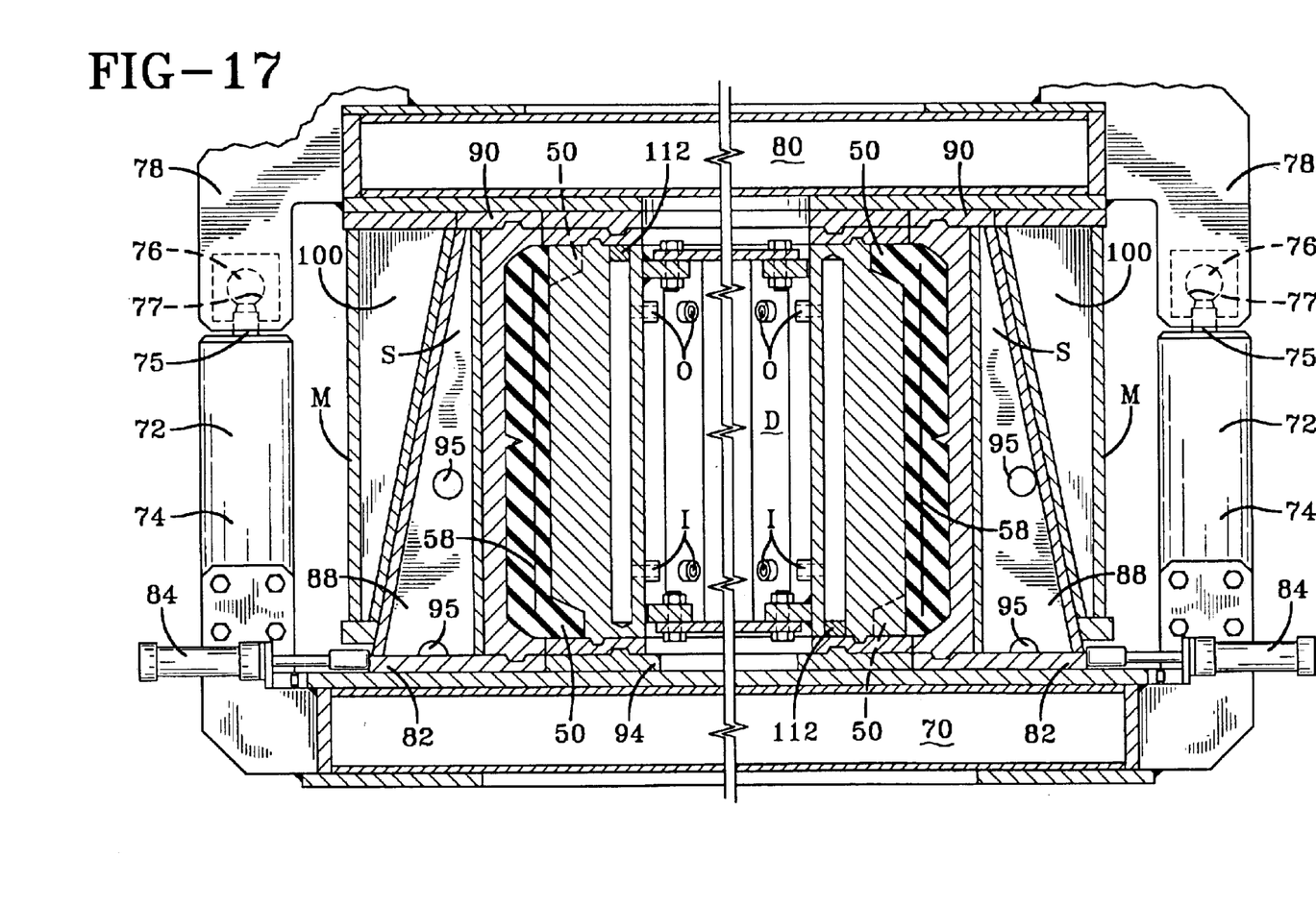

In FIG. 14, the building and curing drum D is shown being lowered within the mold M segments S, with such segments being retracted to their radially outermost position by means of cylinder and piston units 84. Raising and lowering of drum D is affected by a conventional hoist (not shown). Grooves 96 on drum ring 39*a* engages ribs 97 on locking ring 94 to center the drum relative to the cavity of mold M. In FIG. 10, the drum D is shown positioned within mold M for a rubber curing operation and at this time connected to a heating source after which the mold segments are being advanced radially inwardly toward the drum D. At this time, the mold segments S are already heated. Referring to FIG. 16, the mold top 80 has been connected to the balls 76 of the rams 77 by suitable locking means (not shown) for downward movement of the mold top and locking of such top onto the body of the mold. The underside of mold top 80 is provide with a circular pressure cone 100, the inner surfaces of which slidably engage the outer surfaces of mold segment cones 88 as the mold top 80 is pulled downwardly by rams 72. In FIG. 17, the mold top 80 is shown after it has been pulled downwardly to its lowermost position and held therein. During such downward movement the cones 88 of the mold top slide along the outer surfaces of the cones 88 so as to urge the mold segment cones 88 and their outer matrices 86 into contact with the uncured body of rubber 66 carried by the drum D. It has been found that the angle of the engaging surfaces of the inner and outer cones may approximate 8° in order to effect the desired compressing action of the matrices against the uncured rubber without the inner and outer cones locking together as the outer cones advance over the inner cones.

With continued reference to FIG. 17, steam is now admitted into the drum D in a conventional manner so as to heat the track T, and by compression of the rubber under the influence of the radially inwardly directed camming effect of the cones 88 and 100 serves to thoroughly cure and compress the bands of uncured rubber on the drum D from the inside to outside of the body of rubber. It should be understood that heating of the drum D and the mold matrices effects thermal expansion of the drum and mold outer matrices toward one another so as to supplement the compression provided by the camming effect of the cones. Curing of the rubber also bonds the calendered cord and wire cables to such rubber, and additionally effects bonding of the drive lugs 50 to the main body of the uncured rubber. During curing of the rubber, the ribs 92 and recesses 93 of the outer matrices S will form the treads 30 on the outer periphery of the cured and molded rubber track T. In this manner, a completely integral rubber track T is formed whereby the lugs 50 and track 30 will not separate from the track T during vehicle movement.

Referring now to FIGS. 18 and 19, after the rubber has been cured, and the heat source disconnected from the drum D, the mold top 80 removed, cylinder and piston unites 84 are actuated to separate the mold segments, drum D and its completed track T will then be raised out of mold M. Thereafter, bolt and nut combinations 42 will be removed from the outer portion of spokes 34*a* and 34*b* in order than the drum halves D-1 and D-2 may be axially separated. Such separation will affect release of the completed rubber track T from the drums. In order to facilitate release of the completed track T from the drum halves, which define the drum D, the drum halves can receive chilled water through pipes I and O, before the halves are axially separated. Such chilled water in the space 114 defined between the inner and outer portions of the spokes 36*a*, 36*b* thermally contracts the drum D.

The aforedescribed apparatus and method will produce an endless rubber tractor track T of uniform cross-section, which eliminates excessive vibration and remains integral during use over a long service life. Production of such rubber tractor tracks T can be accomplished in a minimum amount of time and at a comparative low cost compared to existing rubber track making systems.

It is believed a most clever feature of the track T is the fact that the guide lugs 50 can be formed at the lateral edges of the track and yet can be made on a core that requires no radially inward movement.

As discussed above, the core D has an internal heating and cooling capability, alternately the core can have a baked on Teflon type coating on the outer surfaces to permit the cured rubber to slip off the core halves D-1 and D-2 as the core halves are separated after molding. In some cases no core internal cooling and heating means are required. This is particularly true on small tracks. This somewhat simplifies the core construction on these molds.

While a particular form of the invention has been illustrated and described, it will also be apparent to those skilled in the art that various modifications can be made without departing from the spirit and scope of the invention. Accordingly, it is not intended that the invention be limited except by the appended claims.

What is claimed is:

1. A mold or an elastic track having guide hugs on the inner circumference and rubber tread lugs was on the outer circumference and a thin band continuously extending in the circumferential directions, the mold comprising:

a radially outer molding portion for forming the tread lugs; and a circular radially inner core for forming the guide lugs the core having separable intermeshing first and second portions, each portion having a plurality of spaced spokes extending from a circular end, the assembled and intermeshed portions having spokes of the first portion being adjacent the spokes of the second portion and spaced from the circular end of the second portion, at the outer circumference of the radially inner core, the spokes of the second portion being spaced from the circular end of the first portion at the outer circumference of the radial inner core, the spaces formed between the circular ends and the spokes forming guide lug cavities.

2. The mold of claim 1 wherein the spokes have a circumferential outer surface having a radius of curvature R, R being the same as the radius of curvature of the circular ends.

3. The mold of claim 1 wherein the spokes have a tapered end, inclined axially outwardly and radially inwardly.

4. The mold of claim 3 wherein the spokes have axially extending sides in contact with the sides of the adjacent spokes of the opposite portion.

5. The mold of claim 4 wherein the spokes are radially supported on one or both sides by an adjacent spoke of the opposite portion.

6. The mold of claim 1 wherein the spokes of the first portion have ends radially supported by the circular end of the second portion.

7. The mold of claim 1 wherein the spokes of the second portion have ends radially supported by the circular end of the first portion.

* * * * *